Figure 1:
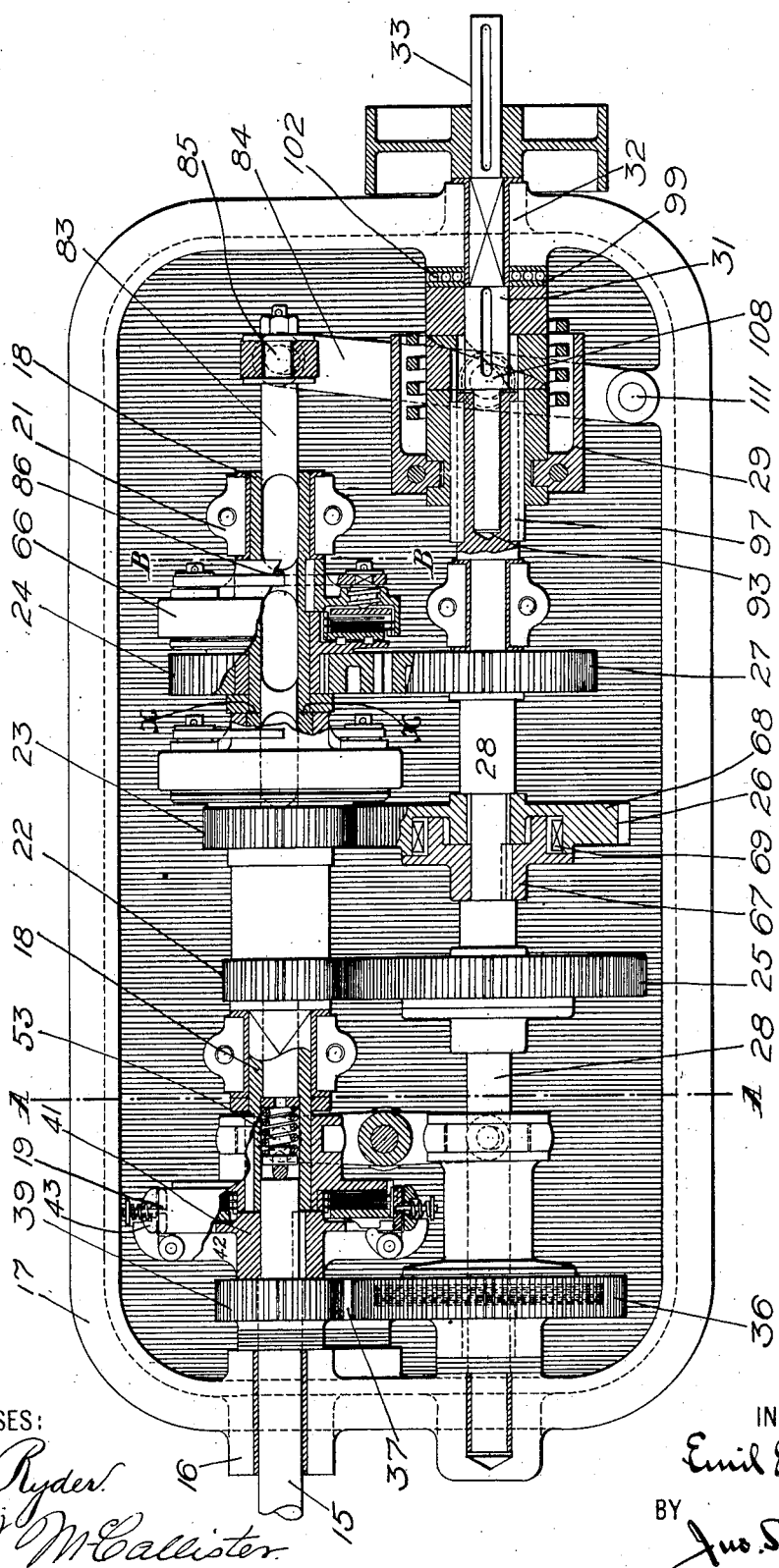

E. E. KELLER.
SPEED CHANGING MECHANISM.
APPLICATION FILED NOV. 14, 1905. RENEWED AUG. 24, 1909.

942,914.

Patented Dec. 14, 1909.
3 SHEETS—SHEET 1.

WITNESSES:
G. L. Ryder
E. W. McCallister

INVENTOR
Emil E. Keller
BY
Jno. S. Green
ATTORNEY

E. E. KELLER.
SPEED CHANGING MECHANISM.
APPLICATION FILED NOV. 14, 1905. RENEWED AUG. 24, 1909.
942,914.
Patented Dec. 14, 1909.
3 SHEETS—SHEET 2.
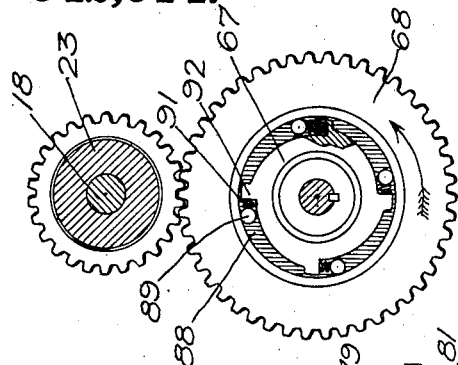
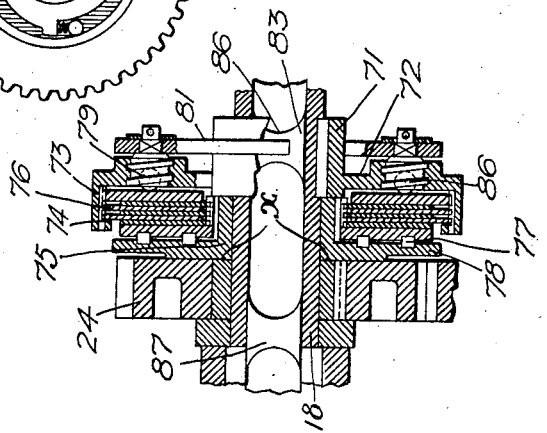
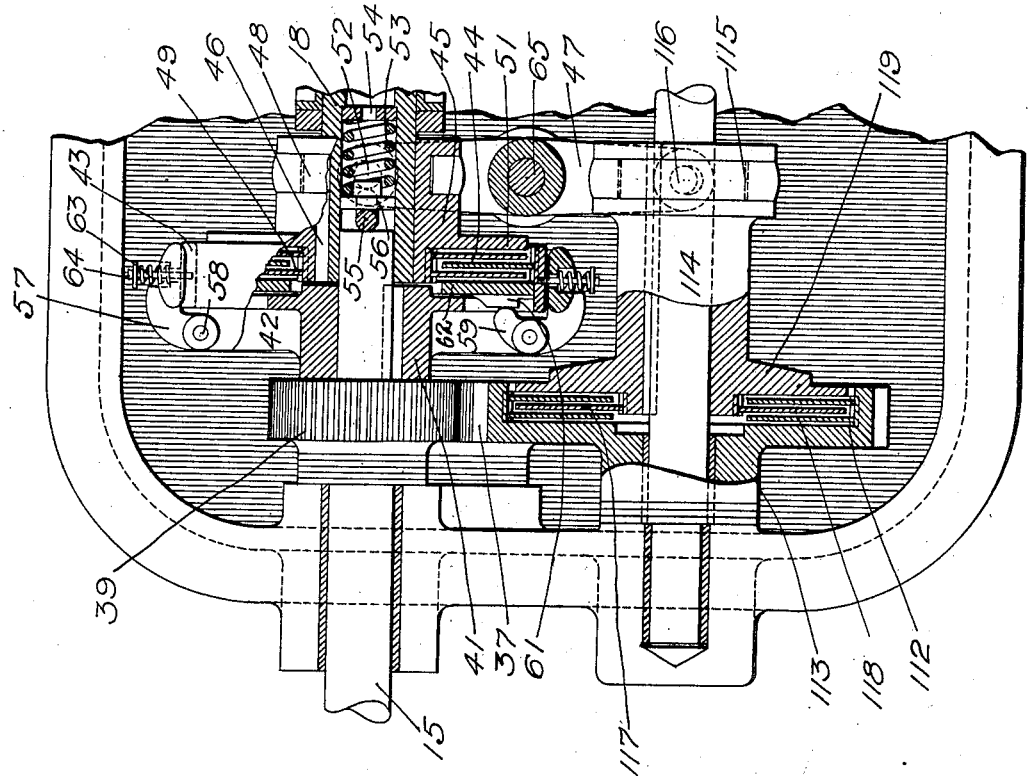
WITNESSES:
INVENTOR
Emil E. Keller
BY
Jno. S. Green
ATTORNEY E. E. KELLER.
SPEED CHANGING MECHANISM.
APPLICATION FILED NOV. 14, 1905. RENEWED AUG. 24, 1909.
942,914.
Patented Dec. 14, 1909.
3 SHEETS—SHEET 3.
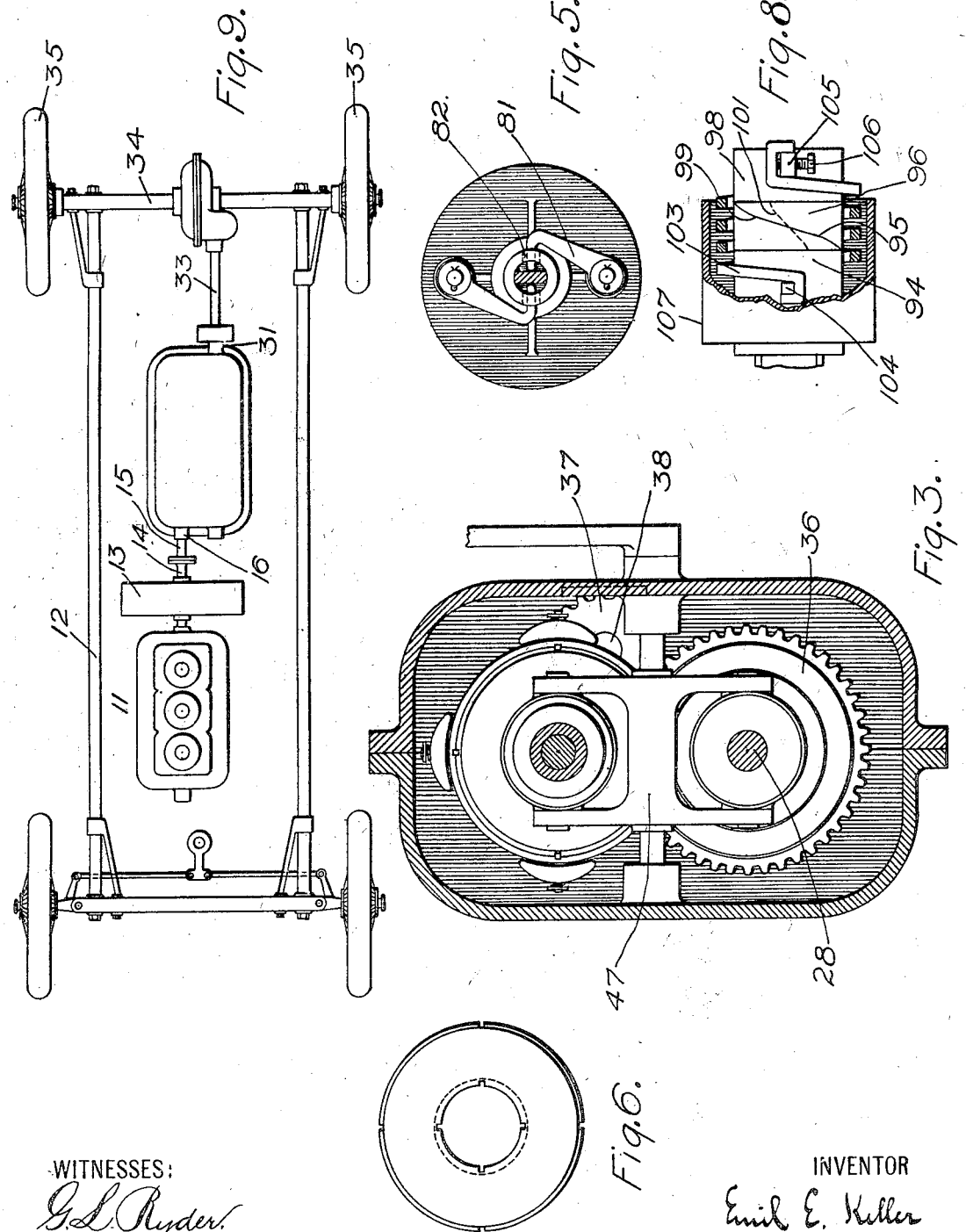
WITNESSES:
G. L. Ryder.
E. W. McCallister
INVENTOR
Emil E. Keller
BY
Jno. S. Green.
ATTORNEY

UNITED STATES PATENT OFFICE.

EMIL E. KELLER, OF PITTSBURG, PENNSYLVANIA.

SPEED-CHANGING MECHANISM.

942,914.      Specification of Letters Patent.      Patented Dec. 14, 1909.

Application filed November 14, 1905, Serial No. 287,311. Renewed August 24, 1909. Serial No. 514,452.

*To all whom it may concern:*

Be it known that I, EMIL E. KELLER, a citizen of the United States, and a resident of Pittsburg, in the county of Allegheny and State of Pennsylvania, have invented a new and useful Improvement in Speed-Changing Mechanisms, of which the following is a specification.

This invention relates to speed-changing mechanisms, and more particularly to means for automatically controlling and operating such mechanisms.

The object of this invention is the production of automatic means for controlling a speed-changing mechanism, such that the torque or purchase of the mechanism is automatically varied to comply with the various loads or resistances encountered. This and other objects I attain in an apparatus embodying the features herein described and illustrated in the drawings accompanying this application, throughout the several views of which corresponding numerals indicate the same parts.

In Figure 1 a speed-changing device embodying my invention is shown partially in elevation and partially in section. Fig. 2 is an enlarged view of a portion of the apparatus shown in Fig. 1. Fig. 3 is a sectional elevation along the line A A of Fig. 1. Fig. 4 is a partial section illustrating an automatically controlled clutch device forming a detail of my invention. Fig. 5 is an end view of the clutch device illustrated in Fig. 4. Fig. 6 is an end view of a detail of the automatic clutch device. Fig. 7 illustrates an overrunning device included in my invention. Fig. 8 illustrates a torque responsive device, a portion of which is broken away for convenience in illustration. Fig. 9 illustrates somewhat diagrammatically the frame of a motor car equipped with an embodiment of my invention.

In the further description of my invention, I will consider it as applied to a motor car with no idea of limiting its application to such machines, or even to vehicles.

The automatic operation of the speed-changing mechanism as applied to a motor car is dependent on the different torsional resistances encountered by the driving mechanism of the car, and as the torsional resistance is almost directly proportional to the road resistance encountered by the car, and as it is practically independent of the speed of the car, a torsionally operated speed-changing device will insure an efficient operation of the engine, whether the car is running fast or slow.

The automatic regulation of the apparatus depends on the fact that, with the road conditions remaining the same and with the motor car well under way, the pull or resistance to motion offered by the back wheels is substantially the same whether the vehicle is moving fast or slow; that is, the pull of the driving wheels in driving the car will be the same, within close limits, whether the vehicle is climbing a hill at a high speed or at a low speed. The engine, however, will expend more power in propelling the car up a given grade through the high speed than it will in propelling it up the same grade through the low speed. The total work expended on the car is the same in each case, but the time in which the work is done varies.

Since the horse-power delivered by an engine is dependent on the number of revolutions of the fly-wheel in conjunction with certain other constant factors, it is readily seen that an engine of ten horse-power as a maximum might drive the motor car up a given grade through the low-speed gear, where it would require an engine of probably twice the horse-power to accomplish the same feat through the high-speed gear. A simple illustration of this is the simple lever in which a certain load may be raised through a unit length by a small force acting at the end of a long force arm, or the same result may be accomplished and the same work done by applying twice the force at the end of a lever arm half as long. The only difference is that the small force moves through twice the distance that the force of twice the strength must move, or the fly-wheel of the ten horse-power engine will make twice as many revolutions as the twenty horse-power engine while driving the car up the grade.

The ordinary gas or gasolene engine does not operate efficiently under varying loads, and it is impossible to efficiently overload them, since an overload slows down the engine and consequently decreases the power delivered. For this reason, my invention is particularly applicable to motor car work, and with its use the load on the engine is kept practically constant by varying the speed of the vehicle, or it might be said, by varying the load arm, through which the effort of the engine is delivered to the car, in accordance with the varying resistances encountered.

The arrangement of the mechanism illustrated herewith is such that, if during the operation of the car the load or load resistance becomes too heavy or great for an efficient operation of the engine through a high-speed gear, the load will be automatically shifted from the high-speed gear to a lower speed gear of greater torque or purchase; thereby rendering the power received from the engine effective and sufficient for driving the car at the lower speed; or, if the power delivered by the engine is in excess of that required by the machine while operating through a low speed gear, the load will be automatically shifted to a higher speed gear of lower torque or purchase, and the car will then be driven at a higher speed. Under these conditions the effort of the engine or motor is rendered practically constant and an efficient operation is insured.

The apparatus comprises an engine 11, which is suitably mounted on the frame portion 12 of a motor car and is provided with a fly-wheel 13, rigidly mounted on a main shaft 14. The shaft 14 is coupled to a shaft 15, which is journaled in a lug 16, formed integrally with casing 17 with which the automatic speed-changing device is provided. The shaft 15 extends into the casing 17 and is adapted to be connected to a shaft 18 through the operation of a centrifugally controlled clutch device 19. The shaft 18 is journaled in standards 21, formed integrally with the casing 17, and is provided with gears 22, 23 and 24, which, respectively, mesh with the gears 25, 26 and 27, mounted on a shaft 28. The shaft 28 is journaled in the casing 17 and is connected by a torque responsive device 29 to a shaft 31, which is journaled in a lug 32 of the casing through which it extends. The shaft 31 is coupled to a shaft 33, which gears with the driving axle 34 of the car, on which the driving wheels 35 are mounted. A reversing gear and clutch device 36 is mounted on the shaft 28 and meshes with a gear 37, which is journaled on a shaft 38, suitably mounted in the casing 17. The gear 37 meshes with and is driven by a gear 39, rigidly mounted on the shaft 15. The automatic operation of the speed-changing device depends upon the operation of the individual parts, which will now be given with a description of the same.

*The centrifugal clutch device.*—A sleeve 41, rigidly mounted on the shaft 15, is provided with a suitable number of radially extending standards 42, on the outer end of which a ring 43 is rigidly mounted. A suitable number of annular friction disks 44 are feathered or otherwise connected to the ring 43 in such a manner that, while they rotate with the ring, they are capable of slight longitudinal motion along the shaft. A sleeve 45 is mounted on the shaft 15 by a key-way connection 46 in such a manner that, while it rotates with the shaft, it is capable of longitudinal motion along it, and the longitudinal motion is controlled by a manually operated lever 47, which is suitably connected to a collar 48, rotatably mounted on the sleeve. Annular friction disks 49, interleaving with the disks 44 are feathered on the sleeve 45 in such a manner that they are capable of longitudinal motion relative to the sleeve. A disk 51 is rigidly mounted on the sleeve 45, adjacent to the interleaving friction disks 44 and 49.

A spring 52, mounted in a recess 53 in the end of the shaft 18 and operating between a pin 54 carried by the shaft and a pin 55 carried by the sleeve 45 and extending through slots 56 into the recess 53, is adapted to hold the sleeve 45 against the sleeve 41. Centrifugal weights 57 are pivotally mounted on pins 58, carried by the standards 42, and are provided with inwardly extending arms 59, which are adapted to contact with lugs 61, suitably arranged on a disk 62, which is feathered to the ring 43, adjacent to the interleaving friction disks 44 and 49 and is, like the interleaving friction disks, capable of slight longitudinal motion relative to the sleeve. The weights 57 are held against the ring 43 by spiral springs 63, which are suitably mounted on stud bolts 64 mounted on the ring.

When the lever 47 is in such a position that the sleeve 45 is in contact with the sleeve 41 and the shaft 15 starts to revolve, the weights 57 are gradually moved outwardly, due to the action of the increasing centrifugal force, which is caused by the accelerated motion of the shaft 15. As the weights move outwardly against the action of the springs 63, the weight arms 59 contact with the lugs 61 of the disk 62 and force the interleaving disks against the plate 51 which is carried by the sleeve 45. At some predetermined speed of the shaft 15 the centrifugal force is such that the friction between the adjacent disks 44 and 49 is sufficient to drive the shaft 18 and take up the load of the car. Since the increase in speed of the shaft 15 is gradual, the centrifugal force will gradually increase and the slipping between the interleaving friction disks will gradually decrease until the shaft 18 is finally driven at the speed of the shaft 15.

While the shaft 15 is being driven at full speed and the weights 57 of the centrifugal clutch are in the extreme operating position, the grip of the centrifugal clutch may be broken and the shaft 15 disconnected from the shaft 18 by moving the sleeve 45, through the agency of the lever 47, out of contact with the sleeve 41 to what may be called the neutral position. With the sleeve 45 in the neutral position, the interleaving friction disks are relieved of the pressure exerted by the weights 57, since the rigidly mounted plate 51, against which they were forced, is moved into an inoperative position. The shaft 18 can again be thrown into operation by moving the sleeve 45 from the neutral position to the operating position and the centrifugal clutch will at once be rendered effective. The lever 47 is pivotally mounted at 65 and is also utilized in controlling the reversing clutch mechanism 36, as will hereinafter be described.

*The speed change gears.*—The different sets of gears, comprising the high, the intermediate and low speed gears, are continually in mesh and the set rendered effective in driving the car is nominated and controlled by the torque responsive device 29. The high speed gear train consists of a gear 24, which is rotatably mounted on the shaft 18, and is provided with an automatically controlled clutch device 66, and a gear 27, rigidly mounted on the shaft 28. The intermediate gear train consists of a gear 23, which is rotatably mounted on the shaft and is provided with a clutch device 66, and a gear 26, which consists of a hub portion 67, rigidly mounted on the shaft 28, and a rotatably mounted rim portion 68, between which and the hub portion an overrunning device 69 is provided. The low speed gear consists of a gear 22, rigidly mounted on the shaft 18, and a gear wheel 25 which, like the gear wheel 26, consists of a hub portion 67 and a rotatably mounted rim portion 68, and is provided with an overrunning device 69.

*The automatically controlled clutches.*— The automatically controlled high speed clutch 66, as illustrated in Fig. 4, in connection with the gear 24, consists of a sleeve 71, rigidly mounted on the shaft 18 and provided with an outwardly extending web portion 72, which is provided with an integrally formed rim portion 73. A suitable number of circular friction disks 74 are keyed to the rim portion 73 in such a manner that, while they rotate with the rim, they are capable of slight longitudinal motion relative to the shaft. A sleeve 75, rigidly secured to the gear 24, is rotatably mounted on the shaft 18 and is provided with a number of circular friction disks 76, which interleave with the friction disks 74 and are keyed to the sleeve 75 in such a manner that they are capable of slight longitudinal motion relative to the shaft 18. A spiral spring 77 is mounted between a disk 78, formed integrally with the sleeve 75, and an adjacent disk of the interleaving friction disks 76. Two heavy pitch screws 79 are mounted in the web portion 72 and are provided with operating arms 81, the ends of which extend into the hollow shaft 18, through openings 82, and contact with an operating rod 83, which is located within the shaft. The rod 83 is operated by a lever 84, to which it is connected at 85, and is provided with a suitably located lug 86, which is so arranged that, for certain positions of the rod, it contacts with the arms 81 and operates the high speed clutches 66. The screws 79 extend through the web 72 and are provided with a thrust ball 86, which contacts with the adjacent plate of the interleaving set 74. The operation of the clutch is as follows:

When the ends of the arms 81 come in contact with the operating lug 86, they are moved outwardly a sufficient amount to turn the screws 79 and cause the thrust ball 86 to be forced against the interleaving plates with a pressure corresponding to the angle through which the screws are turned. The longitudinal motion of the screw compresses the interleaving plates between the thrust ball 81 and the rigidly mounted plate 78, and the arrangement is such that sufficient friction is developed by the pressure between the adjacent faces of the interleaving disks to cause the plates 74, which are mounted on the sleeve 71, to clutch the plates 76, which are mounted on the sleeve 75, and thereby drive the gear 24. The intermediate gear 23 is provided with a clutch device 66 similar to the high speed clutch device, which, for a suitably positioned operating lug 87 of the rod 83, is thrown into operation and renders the intermediate gear train effective in transmitting power. The spiral spring 77 is utilized to take up any wear that may result from the rubbing between the interleaving disks.

*The overrunning device.*—Since the gears comprising the different speed sets are continuously in mesh, it is necessary to provide each of the low speed sets with overrunning devices which will be effective during the operation of a set of higher speed. In this case, the gears 25 and 26 of the low and intermediate sets, respectively, are provided with overrunning devices, which are located, as has been described, between the rigidly mounted hub portion 67 and the rotatably mounted rim portion 68. In Fig. 5 a section of the intermediate speed gear 26 illustrates the overrunning device. The hub portion 67 is keyed to the shaft 28 and is provided at its periphery with tapering recesses 88, in which clutch or grip rollers 89 are mounted. Coiled springs 91 are mounted on suitably extending lugs 92 of the hub portion and are adapted to hold the clutch rollers 89 in contact with the inner periphery of the rim portion 68. The arrangement is such that when the rim 68 is driven by the gear 23 in the direction of the arrow, the rollers 89 will grip the surfaces of the hub and the rim portions and lock the rim to the hub; when the hub portion 67 rotates, relative to the rim portion, in the direction of the arrow, the clutch rollers will disengage and allow the hub to overrun or move in advance of the rim portion.

*The torque responsive device.*—The end of the shaft 28 is provided with a recess 93, into which a reduced portion of the shaft 31 extends. A sleeve 94, which at one end is provided with helical surfaces 95 and 96, is mounted on the shaft 28 by feather-way connections 97 in such a manner that, while it rotates with the shaft, it is capable of considerable longitudinal motion relative to it. A sleeve 98 is provided with helical surfaces 99 and 101, which correspond to the surfaces 95 and 96 of the sleeve 94. The sleeve 98 is keyed to the shaft 31 and a roller thrust joint 102 is provided between it and the casing 17. A spiral spring 103 encircles the sleeves 94 and 98 and is mounted on suitable lugs 104 and 105, with which the respective sleeves are provided. The lug 105 is provided with a set screw 106, utilized in adjusting the tension of the spring 103. A sleeve 107, rotatably mounted on the sleeve 94, surrounds the spring 103 and is provided with a suitably mounted pin or trunnion 108, which is attached to the lever 84. The spring 103 is adapted to hold the corresponding helical surfaces of the sleeves 94 and 98 in contact, and is designed to sustain with little or no distortion a pull or resistance to motion of the driving wheels of the car that the engine can efficiently overcome while operating through the high speed gears. Greater pulls or resistances cause the spring to elongate or distort definite amounts proportional to the resistances. Within certain predetermined limits of slight distortional resistance (or for slight resistance to motion of the driving wheels) the spring 103 will transmit the effort of the engine to the driving wheels without distortion. For greater resistances the spring will elongate definite amounts, thereby permitting the shaft 31, and consequently the sleeve 98, to lag behind the shaft 28 and the sleeve 94 certain definite amounts, which are proportional to the encountered resistance. Under such conditions, the face 101 of the sleeve 98 will recede from the face 96 of the sleeve 94 and the helical face 99 of the sleeve 98 will ride up the helical face 95 of the sleeve 94, thereby causing the sleeve 94 to move longitudinally along the shaft and occupy different positions. The lever 84 is fulcrumed at 111 on the casing 17 and is arranged to actuate the rod 83 in accordance with the reciprocations of the sleeve 94. The lug 86 is so positioned on the rod that the high speed disk clutch is rendered effective when the sleeves 94 and 98 are in their normal relative positions, and the lug 87 is so positioned that the intermediate clutch is rendered effective just before the high speed clutch is rendered ineffective by the longitudinal motion of the sleeve 94. The overlapping of the clutches is rendered permissible by the overrunning devices 69, with which the intermediate speed gear is provided. For a further increase of torsional resistances the rod 83 is moved to such a position that the intermediate clutch is also rendered ineffective and the car is then driven through the low speed gears which have all the while been overrunning.

As the road resistance or pull of the back wheels decreases, the lag of the shaft 31 will gradually decrease and the sleeve 94 will be moved back along the shaft 28 by the spring 103 and the intermediate clutch will again be rendered ineffective, and finally, for a greater decrease of road resistance the high speed clutch will be rendered effective. The lugs 86 and 87 are so positioned that the high speed gear will be brought into operation by the decreasing torque or resistance before the intermediate speed clutch is rendered ineffective.

*The reversing gears.*—The reversing clutch mechanism 36 consists of a rim portion 112, rigidly mounted on a hub 113, which is rotatably mounted on the shaft 28. A sleeve 114 is keyed on the shaft 28 in such a manner that, while it rotates with the shaft, it is capable of longitudinal motion relative to it. A collar 115, rotatably mounted on the sleeve 114, is suitably connected to the lever 47 by a pin 116. A series of friction disks 117, feathered on the sleeve 114, interleave with friction disks 118, feathered on the inner periphery of the rim 112, and a plate 119 is rigidly mounted on the sleeve 114. The arrangement is such that, when the lever 47 is thrown to the reversing position, the centrifugal clutch 19 is first rendered ineffective, and then the sleeve 114, in moving to the left, compresses the friction disks 117 and 118, thereby clutching the rotatably mounted rim portion 112 and driving the shaft 28 through the gears 39 and 37 and the clutch mechanism 36. In relieving the reversing clutch of the load of the car the lever 47 is thrown to the neutral position, in which the driving mechanism of the car is rendered independent of the engine. By this arrangement the reversing lever can be operated with impunity, since the gears are always in mesh, and there is little danger of stripping the teeth, and since the power is transmitted to the driving wheels through two friction disk clutches, the inertia of the car while being overcome by the engine will produce slipping between the disk clutches, which will therefore act as a brake.

The entire speed-changing mechanism, including the clutches, the reversing gears, and the torque responsive device, is inclosed within the casing 17, which is adapted to be filled with oil or other suitable lubricant.

The operation of the organized device is as follows: The engine in starting runs free of the driving mechanism of the car; after it has attained a predetermined speed the centrifugal clutch 11 is gradually rendered effective and the car starts to move slowly forward. As soon as the centrifugal clutch is rendered effective the engine encounters the greatest resistance the existing conditions can produce; that is, the friction of rest of the car and the driving mechanism in addition to the existing road resistance. The spring 103 is immediately thrown into tension and the shaft 18 lags a definite amount, corresponding to the encountered resistance, and the sleeve 94, in moving along the shaft 28, renders effective, through the agency of the lever 84 and the rod 83, the set of speed gears arranged to operate under the encountered resistance. During the operation of the car the variations of torsional resistance encountered automatically control the operation of the clutches 66, so that at all times the engine runs under practically the same load and therefore no variations of engine speed will be encountered. The lugs 86 and 87 are so arranged that the clutches 66 will be gradually relieved of their load, so that there will never be an abrupt change of speed. Throughout the entire automatic operation of the car the load on the engine is kept constant, within close limits, by varying the speed of the car in accordance with the varying resistances encountered, or, more properly, by varying the torque (turning-moment) or purchase of the transmission mechanism through which the effort of the engine is delivered to the driving wheels of the car, in accordance with the varying road resistances encountered.

When the engine encounters resistances that it cannot overcome while operating through the low speed gear, it will not be stalled or stopped, since after it has slowed down a predetermined amount the centrifugal clutch 19 will be rendered ineffective and the engine will be practically relieved of the load of the car. (The tension of the spring 103 can be so adjusted by the set screw 106 that the time of operation of the speed gears can be controlled.) Since the torsional resistance encountered by the driving mechanism is substantially independent of the speed, the torsional controlling device will be effective whether the engine is running fast or slow, and if means are utilized for manually operating the centrifugal clutch, the engine may be throttled down and run at any desired speed.

As before stated, this invention is not limited to use in motor vehicles; the principle of the same is particularly applicable to cranes or other lifting or hoisting devices, and it will be understood that the claims, where not specifically limited to motor vehicles, are to be considered broad enough to be read into any power transmission mechanism.

It is obvious that many variations and changes in the details of construction will readily suggest themselves to persons skilled in the art, and still fall within the scope and spirit of this invention, and that many of the features shown and described may be omitted or used either alone or in association with others not shown or described. The invention, therefore, is not limited or restricted to the exact details of construction or arrangement shown and above set forth; but Having set forth the object of this invention and a form of construction embodying the principle thereof, and having described such construction, the function and mode of operation, what is claimed as new and useful and sought to be secured by Letters Patent is:

1. In a power transmitting apparatus, a plurality of independently operable clutch devices, means by which said devices are caused to transmit power and torque controlled mechanism upon which the operation of said means is dependent.

2. In a power transmitting apparatus, a plurality of independently operable clutch and gearing devices, means by which said devices are caused to separately transmit power and torque responsive mechanism for controlling the operation of said means.

3. In a power transmitting apparatus, a plurality of independently operable clutch and gearing devices and torque responsive mechanism for operating said devices.

4. In a power transmitting apparatus, in combination with a power shaft, a member rotatable with said shaft and adapted to lag in relation thereto, a plurality of independently operable clutch devices and means whereby the operation of said clutch devices is dependent upon the degree of such lag.

5. In a power transmitting apparatus adapted for use in automobiles, the combination with a plurality of independently operable clutch devices of power transmitting gear trains and torque responsive means dependent upon the load or load resistance for controlling the operation of said clutch devices.

6. In a power transmitting apparatus, a power shaft, a driven shaft, a plurality of independent power transmitting clutch and gearing devices between said shafts and mechanism dependent upon the load and independent of the speed of the power shaft for controlling the operation of said devices.

7. In a power transmitting apparatus, a power shaft, a driven shaft, a plurality of independent power transmitting devices between said shafts and a mechanism dependent upon the load and independent of the speed of the power shaft for automatically operating one or the other of said devices.

8. In a power transmitting device, a power shaft, a driven shaft, a plurality of independent power transmitting devices between said shafts all but one of which are normally inoperative and a torque responsive mechanism for rendering one or another of said devices effective in transmitting power.

9. In a power transmitting apparatus, a plurality of independent power transmission devices and torque responsive mechanism for independently operating said devices.

10. The combination with a driving part, of a part to be driven therefrom, a plurality of independently operable speed-change devices, an elastic driving coupling between said speed-change devices and the part to be driven, which permits of relative angular lag between said parts, the degree of which is dependent upon the load encountered, and means, the operation of which is dependent upon the degree of such lag for automatically controlling the operation of said speed-change devices.

11. The combination with a driving part, of a part to be driven, a plurality of independently operable turning-moment varying devices, an elastic driving coupling between the turning moment varying devices and the part to be driven, which permits of relative angular lag between said parts, the degree of which is dependent upon the load encountered, and means, the operation of which is dependent upon the degree of said lag for controlling the operation of the said turning moment varying devices.

12. The combination with a driving part, of a part to be driven, a plurality of independently operable turning-moment varying devices, a spring driving connection between said devices and the part to be driven, which permits of relative angular lag between said parts, and means, the operation of which is dependent upon the degree of said lag for automatically controlling the operation of said devices.

13. In combination with a driving part, a driven part, a plurality of independently operable turning-moment varying devices, means between the driven part and said devices whereby relative angular lag between said parts is permitted and mechanism, the operation of which is dependent upon the degree of such lag for operating said devices.

14. In a power transmission apparatus, the combination of a driving part and a part to be driven, a plurality of independently operable turning-moment varying devices between the driving part and the part to be driven, an extensible driving connection between said devices and the part to be driven whereby said part may lag and means, the operation of which is dependent upon the degree of said lag for controlling the operation of said devices.

15. In combination with a motor driven shaft, a part to be driven therefrom, a plurality of independently operable clutch and gearing devices, a torque responsive agent between said devices and said part to be driven for controlling the operation of said clutch and gearing devices and a centrifugally controlled clutch device for automatically connecting said motor driven shaft to said clutch and gearing devices when said motor driven shaft attains a predetermined speed of rotation.

16. In combination with a driving shaft, a driven shaft, a plurality of independently operable clutch and gearing devices and a torque responsive agent between said devices and the driven shaft for controlling the operation of said clutch and gearing devices and means for automatically rendering said devices effective when the driving shaft attains a predetermined speed of rotation.

17. In combination with a motor driven shaft, a shaft to be driven therefrom, a plurality of speed change devices, torque responsive mechanism between said devices and said part to be driven for controlling the operation of said devices, means for automatically connecting said shaft to said devices when said shaft attains a predetermined speed of rotation, reversing gearing and manually operated means for disconnecting said automatic connecting device and for connecting said motor driven shaft to said part to be driven through said reversing gearing.

18. The combination with a driving shaft, of a driven shaft, a plurality of clutch and gearing devices between said shafts, an automatic centrifugally controlled clutch device for connecting said driving shaft with said clutch and gearing devices when said shaft attains a predetermined speed of revolution, normally inoperative reversing gearing between said shafts and manually operated means whereby said automatic clutch device is rendered ineffective when said reversing gearing is rendered operative, and vice versa.

19. In a power transmission mechanism, in combination with a driving part and a part to be driven therefrom, a plurality of power transmitting devices and an agent between said devices and the part to be driven, for automatically controlling the operation of said devices, said agent comprising a driving part, a driven part and a yielding connection between said parts whereby relative angular lag between said parts is permitted; the mechanism being so arranged that the turning moment employed is dependent upon the degree of such lag.

20. In a power transmitting mechanism, a driving shaft and a driven shaft, a plurality of clutch and gear devices between said driving and said driven shafts, a torque responsive agent for controlling said clutch and gear devices, and a centrifugally controlled clutch device for rendering said clutch and gear devices effective as power transmitting agents.

21. In a power transmitting mechanism, in combination with the driving and a driven part, a speed change device comprising a plurality of clutch and gear devices, an elastic coupling between said speed change device and the driven part, which permits of relative angular lag between said parts, the degree of which is dependent on the load encountered, means, the operation of which is dependent upon the degree of such lag for automatically controlling the operation of the speed change device, a motor driven shaft, and a manually disconnectible automatic clutch device for connecting the motor driven shaft with the driving part when said motor driven shaft attains a predetermined speed of revolution.

22. In a power transmitting apparatus, a plurality of independently operable clutch devices, and torque responsive means for throwing one or another of said devices into operation.

23. In a power transmitting apparatus, in combination with a power shaft, a rotatable member driven by said shaft, a plurality of independently operable clutch devices between said member and said shaft, a flexible coupling which permits said member to lag behind said shaft in transmitting power, and means, rendered operable by said lag, for throwing into operation one or another of said clutch devices.

24. In a power transmitting device for automobiles, a power shaft, a driven shaft, a plurality of independent power transmitting devices between said shafts, all but one of which are normally inoperative at one time, and a torque responsive mechanism for throwing into or out of operation one or another of said devices and thereby varying the effective turning moment of the power shaft directly in accordance with the varying load encountered by said driven shaft.

25. In combination with a power shaft, a driven shaft, a speed change device between said power shaft and said driven shaft, comprising a plurality of sets of transmission gears and independently operable coöperating clutch devices, a flexible connection between said power shaft and said driven shaft whereby said driven shaft is permitted to lag in transmitting power, and means, rendered operable by said lag, for throwing into operation, through the agency of one of said clutch devices, one or another of said gear sets, whereby the effective turning moment of said power shaft is varied directly and substantially in the same proportion as the variations of load on said driven shaft.

26. In a power transmitting mechanism, a driving member, a driven member, a plurality of power transmitting devices between said driving and said driven member, all but one of which are normally inoperative at a time, and a torque responsive mechanism between said devices and said driven member for throwing into and out of operation one or another of said devices and thereby varying the effective turning moment of the driving member directly in accordance with the varying load encountered by said driven member.

27. In combination with a driving and a driven part, a set of speed change gears between said parts, means for rendering said gears effective or ineffective as power transmitting agents and a load responsive device between said gears and said driven parts for controlling the operation of said means.

28. In combination with a driving and driven part, a set of speed change gears between said parts, a clutch mechanism for controlling the operation of said gears and a load responsive device between said gears and said driven part, for controlling the operation of said clutch mechanism.

29. In combination with a driving and a driven part, a set of speed change gears between said parts, a clutch mechanism for controlling the operation of said gears, a load responsive device between said gears and said driven part for controlling the operation of said clutch mechanism and an overrunning device for one of the gears of said set.

30. In combination with a driving and a driven part, a plurality of sets of speed change gears between said parts, means for controlling the operation of said gears and a load responsive device between said gears and said driven part for controlling the operation of said means.

31. In combination with a driving and a driven part, a plurality of sets of speed change gears between said parts, clutch mechanisms for controlling the operation of said gears and a load responsive device between said gears and said driven part for controlling the operation of said clutch mechanism.

32. In combination with a driving and a driven part, a plurality of sets of speed change gears between said parts, clutch mechanisms for controlling the operation of said gears, a load responsive device between said gears and said driven part for controlling the operation of said clutch mechanisms and an overrunning device for at least one of said sets of gears.

33. In combination with a driving and a driven part, a speed change device between said parts, a yielding coupling between said speed change device and said driven part whereby said part is caused to lag behind said driving part and means for rendering the relative motion between said parts effective in controlling the operation of said speed change device.

34. In combination with a driving and a driven part, a plurality of sets of speed change gears between said parts, clutch mechanisms for controlling the operation of said gears, a yielding coupling between said gears and said driven part whereby said driven part is caused to lag behind said driving part and means for rendering the relative motion between said parts effective in controlling the operation of said speed change gears.

35. In combination with a driving and a driven part, a set of speed change gears between said parts, means located between said gears and said driven part for causing relative angular lag between said parts and means controlled by the relative motion between said parts for rendering said gears effective or ineffective as power transmitting agents.

36. In combination with a driving shaft and a driven shaft, a plurality of clutch and gearing devices, a torque responsive agent between said clutch and gearing devices and said driven shaft and means for automatically rendering said clutch and gearing devices effective when the driving shaft attains a determined speed of rotation.

37. In combination with a driving and a driven part, a speed change device comprising a plurality of sets of gear trains and a torque responsive device between said driven part and said speed change device for automatically controlling the operation of said speed change device.

38. In a speed change mechanism, a set of ahead gears and a set of reversing gears, a clutch mechanism for controlling the mechanism of said ahead gears, automatic means controlling the operation of said clutch mechanism and means for rendering said automatic means ineffective and for rendering said reversing gears effective in transmitting power.

39. In combination with a driving and a driven part, a set of reversing gears, a set of ahead gears, and a manually disconnectible automatic clutch device for controlling the operation of said ahead gears.

40. The combination with a driving part, of a part to be driven therefrom, a plurality of sets of gears, a clutch device for rendering one or more of said sets of gears effective, a torque responsive device between said clutch device and the part to be driven and an overrunning device in at least one of said sets of gears which permits the operation of said sets of gears to overlap.

41. In a speed change mechanism, a set of ahead gears, a set of reversing gears, a clutch device for controlling the operation of said ahead gears, a clutch device for controlling the operation of said reverse gears, automatic means for rendering the clutch device of said set of ahead gears effective and manually operated means for rendering the automatic means ineffective and said reversing clutch effective.

In testimony whereof, I have hereunto subscribed my name this tenth day of November, 1905.

EMIL E. KELLER.

Witnesses:
DAVID WILLIAMS,
J. L. HALL.